(12) United States Patent
Mourlam

(10) Patent No.: US 10,427,926 B2
(45) Date of Patent: Oct. 1, 2019

(54) BOOM LOAD MONITORING

(71) Applicant: Altec Industries, Inc., Birmingham, AL (US)

(72) Inventor: Timothy J. Mourlam, Kansas City, KS (US)

(73) Assignee: Altec Industries, Inc., Birmingham, AL (US)

( * ) Notice: Subject to any disclaimer, the term of this patent is extended or adjusted under 35 U.S.C. 154(b) by 0 days.

(21) Appl. No.: 15/851,930

(22) Filed: Dec. 22, 2017

(65) Prior Publication Data

US 2019/0194007 A1 Jun. 27, 2019

(51) Int. Cl.
| | |
|---|---|
| *B66F 17/00* | (2006.01) |
| *B66C 23/90* | (2006.01) |
| *B66C 15/06* | (2006.01) |
| *B60Q 9/00* | (2006.01) |
| *F15B 19/00* | (2006.01) |
| *G01L 13/00* | (2006.01) |
| *G01C 9/00* | (2006.01) |
| *B66F 11/04* | (2006.01) |

(52) U.S. Cl.
CPC .............. *B66F 17/006* (2013.01); *B60Q 9/00* (2013.01); *F15B 19/005* (2013.01); *G01C 9/00* (2013.01); *G01L 13/00* (2013.01); *B66F 11/046* (2013.01); *F15B 2211/857* (2013.01)

(58) Field of Classification Search
CPC .............................. B66F 11/04; E01D 19/106
See application file for complete search history.

(56) References Cited

U.S. PATENT DOCUMENTS

| | | | | |
|---|---|---|---|---|
| 4,456,093 A | * | 6/1984 | Finley | ................... B66F 17/006 182/18 |
| 5,160,055 A | * | 11/1992 | Gray | ....................... B66C 23/90 212/278 |
| 8,215,178 B2 | | 7/2012 | Saigh | |
| 2008/0169131 A1 | * | 7/2008 | Takeda | ...................... E02F 9/26 177/136 |
| 2014/0245734 A1 | * | 9/2014 | Kim | ........................ F15B 7/006 60/469 |
| 2015/0336776 A1 | | 11/2015 | St-Yves | |
| 2017/0183845 A1 | * | 6/2017 | Izumikawa | ............. E02F 9/264 |

* cited by examiner

*Primary Examiner* — Charles J Han
(74) *Attorney, Agent, or Firm* — Erise IP, P.A.

(57) ABSTRACT

A boom monitoring system includes at least one sensor for monitoring information about a boom in real time, and a controller that performs the steps of determining an effective load applied to the boom based on the information from the at least one sensor and determining whether the effective load exceeds a predetermined limit. The system further includes an alert indicator communicatively coupled to the controller for producing an alert when the effective load exceeds the predetermined limit. A boom monitoring method includes determining a current boom geometry based on at least one sensor, determining a load limit based on the current boom geometry and predetermined load values, determining an effective load based on a hydraulic fluid pressure of a boom hydraulic cylinder, determining whether the effective load exceeds the load limit, and producing an alert when the effective load exceeds the load limit.

16 Claims, 5 Drawing Sheets

BOOM LOAD MONITORING

RELATED APPLICATIONS

Embodiments and/or features of the invention described in the present document may be used with the subject matter disclosed in commonly assigned and concurrently filed U.S. patent application Ser. No. 15/852,024 filed Dec. 22, 2017, and entitled "CHASSIS-STABILIZING SYSTEM." The concurrently filed patent application is hereby incorporated by reference in its entirety into the present application.

BACKGROUND

1. Field

Embodiments of this disclosure relate generally to safety systems for use with various other systems. More specifically, embodiments of this disclosure relate to systems for establishing safe operating limits associated with devices for moving a load.

2. Related Art

Various safety-monitoring systems provide monitoring of a device operated under certain conditions and provide warnings to an operator when the operation is deemed to be unsafe.

SUMMARY

Embodiments of this disclosure provide a boom load monitoring system and method. The boom load monitoring system includes at least one sensor that provides information to a controller about a real-time load level associated with a device having an extendable arm or boom, such as an aerial device. The controller determines if a load limit has been reached and provides a signal or other indication to alert a user of the aerial device that a load limit has been reached. The boom load monitoring system enables a user to avoid unsafe situations that may otherwise damage equipment or harm personnel.

A first embodiment is directed to a boom monitoring system. The system includes at least one sensor for monitoring information about a boom in real time, the at least one sensor adapted to monitor a hydraulic fluid pressure of a hydraulic cylinder mechanically coupled to the boom for raising and lowering the boom, and a controller having a non-transitory memory and a processor for processing software instructions stored in the memory, the controller being communicatively coupled with the at least one sensor. The controller performs the steps of determining an effective load applied to the boom based on the information from the at least one sensor and determining whether the effective load exceeds a predetermined limit. The system further includes an alert indicator communicatively coupled to the controller for producing an alert when the effective load exceeds the predetermined limit.

A second embodiment is directed to a boom load monitoring system. The system includes a first sensor that monitors a lower boom angle, the lower boom angle being between a lower segment of a boom and a substantially horizontal plane, a second sensor that monitors an upper boom joint angle, the upper boom joint angle being between the lower segment and an upper segment of the boom, and a third sensor that monitors a hydraulic fluid pressure of an upper boom hydraulic cylinder configured to pivotally raise and lower the upper segment with respect to the lower segment. The system further includes a controller having a non-transitory memory and a processor for processing software instructions stored in the memory, the controller being communicatively coupled with the first sensor, the second sensor, and the third sensor, wherein the controller performs the steps of determining a load limit based on the lower boom angle, the upper boom joint angle, and predetermined load values stored in the memory, determining an effective load applied to the boom based on the lower boom angle, the upper boom joint angle, and the hydraulic fluid pressure, and determining whether the effective load exceeds the load limit. The system further includes an alert indicator communicatively coupled to the controller for producing an alert when the effective load exceeds the load limit.

A third embodiment is directed to a boom monitoring method. The method includes determining a current boom geometry based on at least one sensor, determining a load limit based on the current boom geometry and predetermined load values, determining an effective load based on a hydraulic fluid pressure of a boom hydraulic cylinder, determining whether the effective load exceeds the load limit, and producing an alert when the effective load exceeds the load limit.

Another embodiment may be directed to an aerial device, including a base, a boom, and a boom load monitoring system. Still another embodiment may be directed to a grappler, including grappler arms connected to a moveable arm or boom, and a boom load monitoring system. Yet another embodiment may be directed to a tree-trimming device including grappler arms for grabbing a tree limb and shearing blades for cutting the tree limb, with the grappler arms and shearing blades mechanically coupled to a telescoping, angling, and rotating boom for positioning the grappler arms and shearing blades to trim tree limbs. Yet a further embodiment may be directed to a vehicle, including a boom and a boom load monitoring system. Other embodiments will also be discussed throughout the present disclosure.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages will be apparent from the following detailed description of the embodiments and the accompanying drawing figures.

BRIEF DESCRIPTION OF THE DRAWING FIGURES

Embodiments of this disclosure are described in detail below with reference to the attached drawing figures, wherein.

Figure 1:
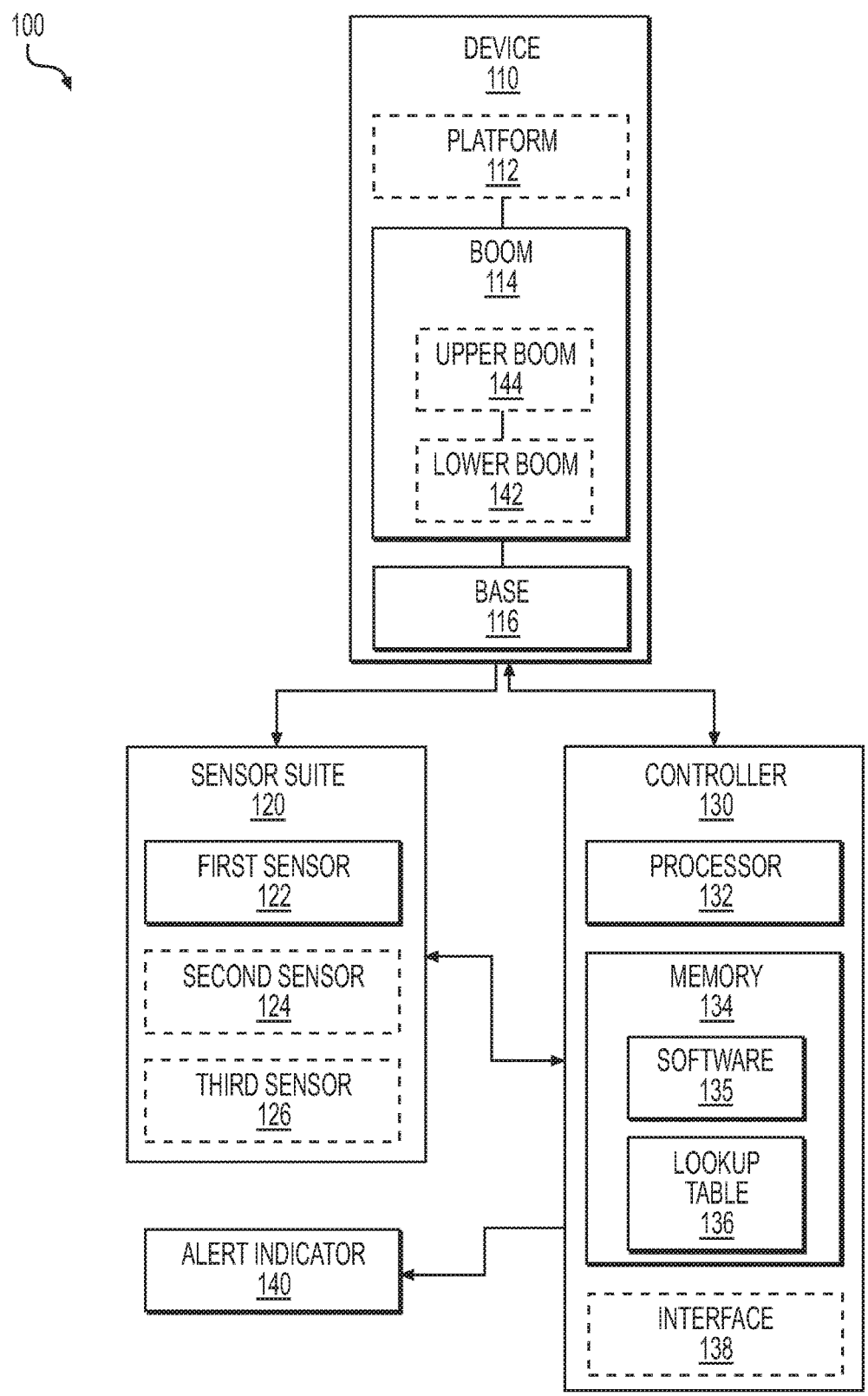
FIG. 1 is a block diagram illustrating a boom monitoring system, in an embodiment.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

FIG. 1 shows a block diagram of an exemplary boom load monitoring system 100. The boom load monitoring system 100 comprises a device 110, a sensor suite 120 having at least one sensor, a controller 130, and an alert indicator 140. In certain embodiments, the device 110 is an aerial device used to access elevated objects or otherwise difficult to reach items. In some embodiments, the device 110 includes a boom 114 that is rotatable and extendable. The boom 114 may be used to lift and move or suspend an object, such that the weight of the object applies a load to the boom 114.

Figure 2:
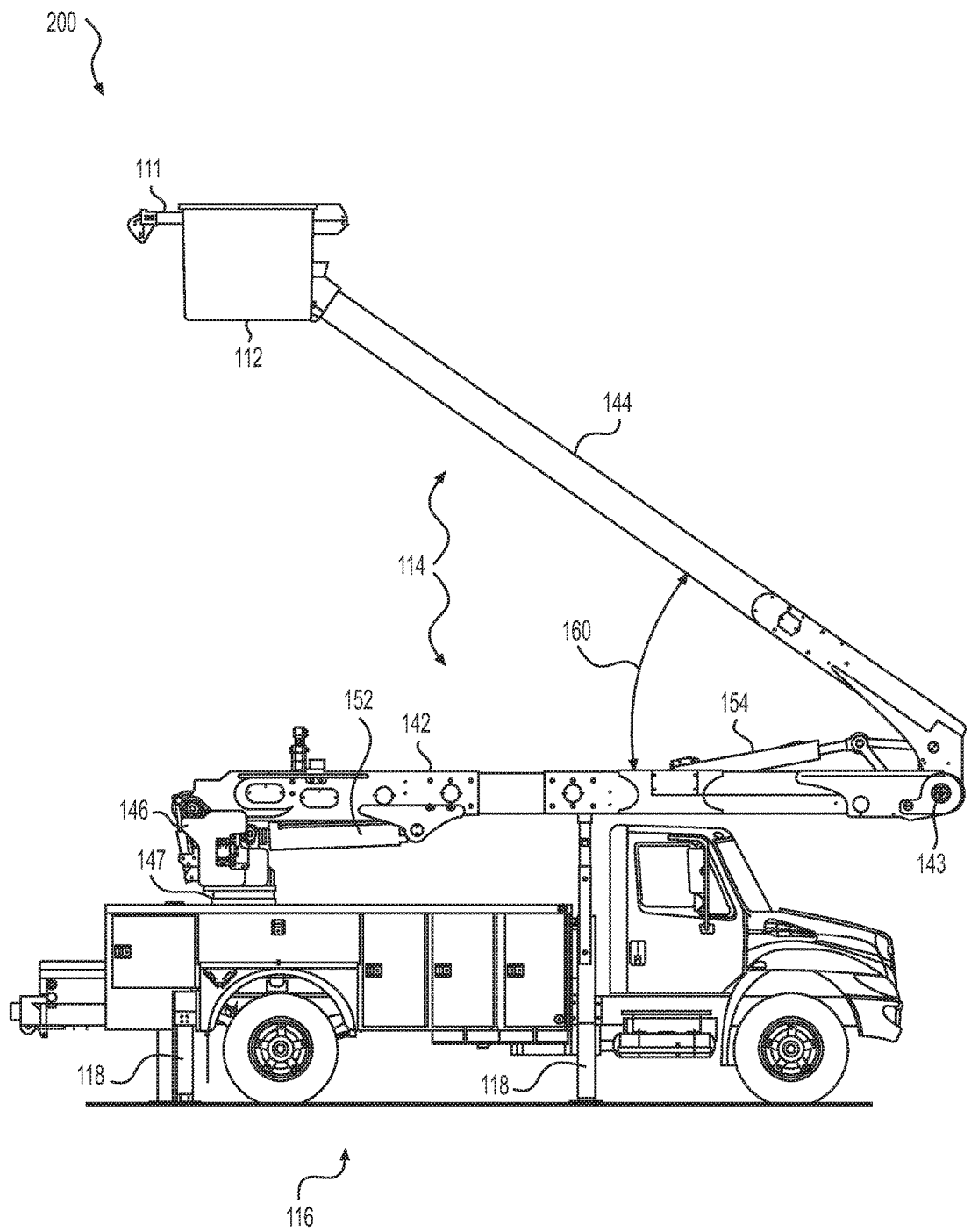
FIG. 2 shows a side view of an aerial device for use with the boom monitoring system of FIG. 1, in an embodiment.
Figure 3:
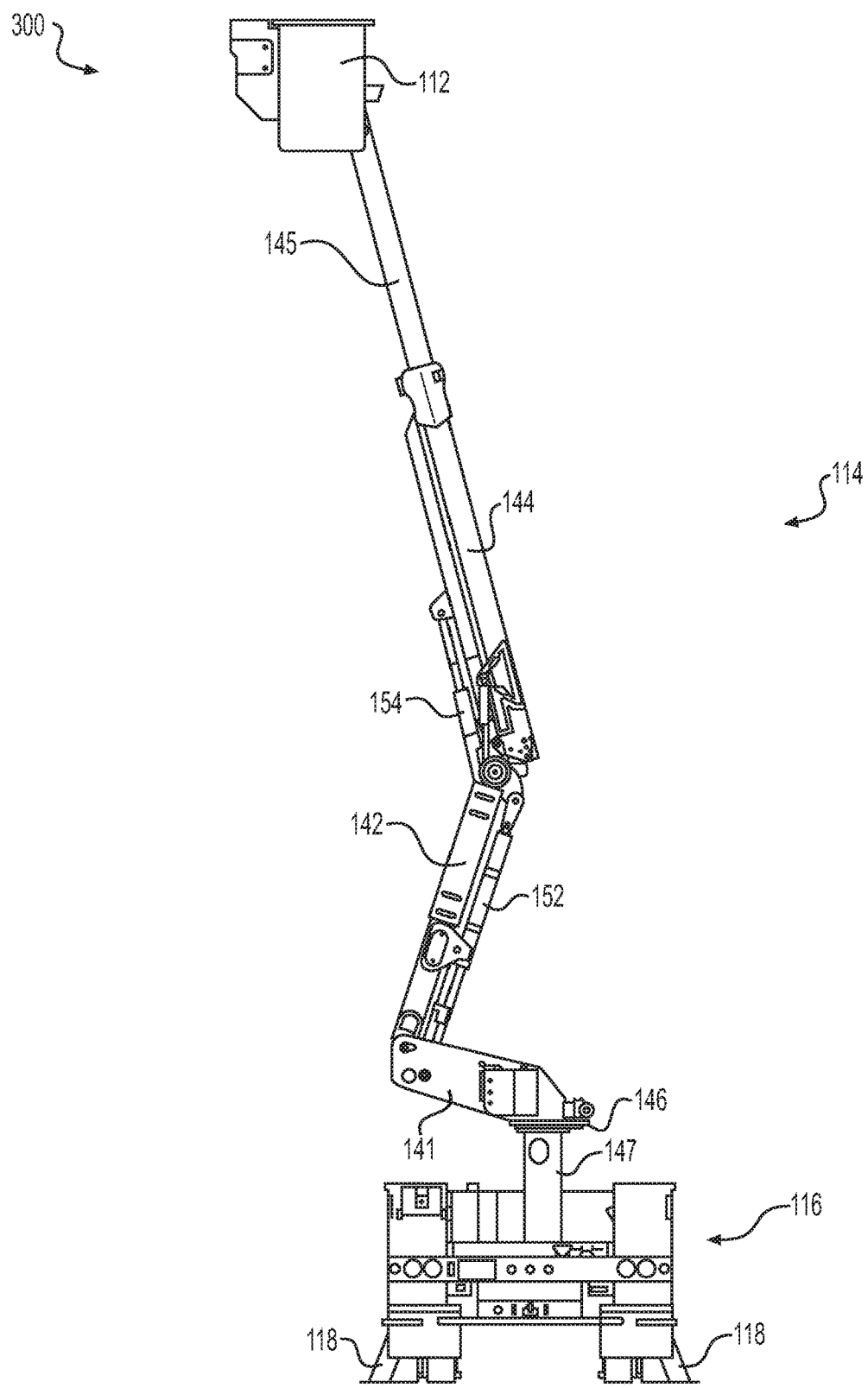
FIG. 3 shows a rear view of an aerial device for use with the boom monitoring system of FIG. 1, in an embodiment.
Figure 4:
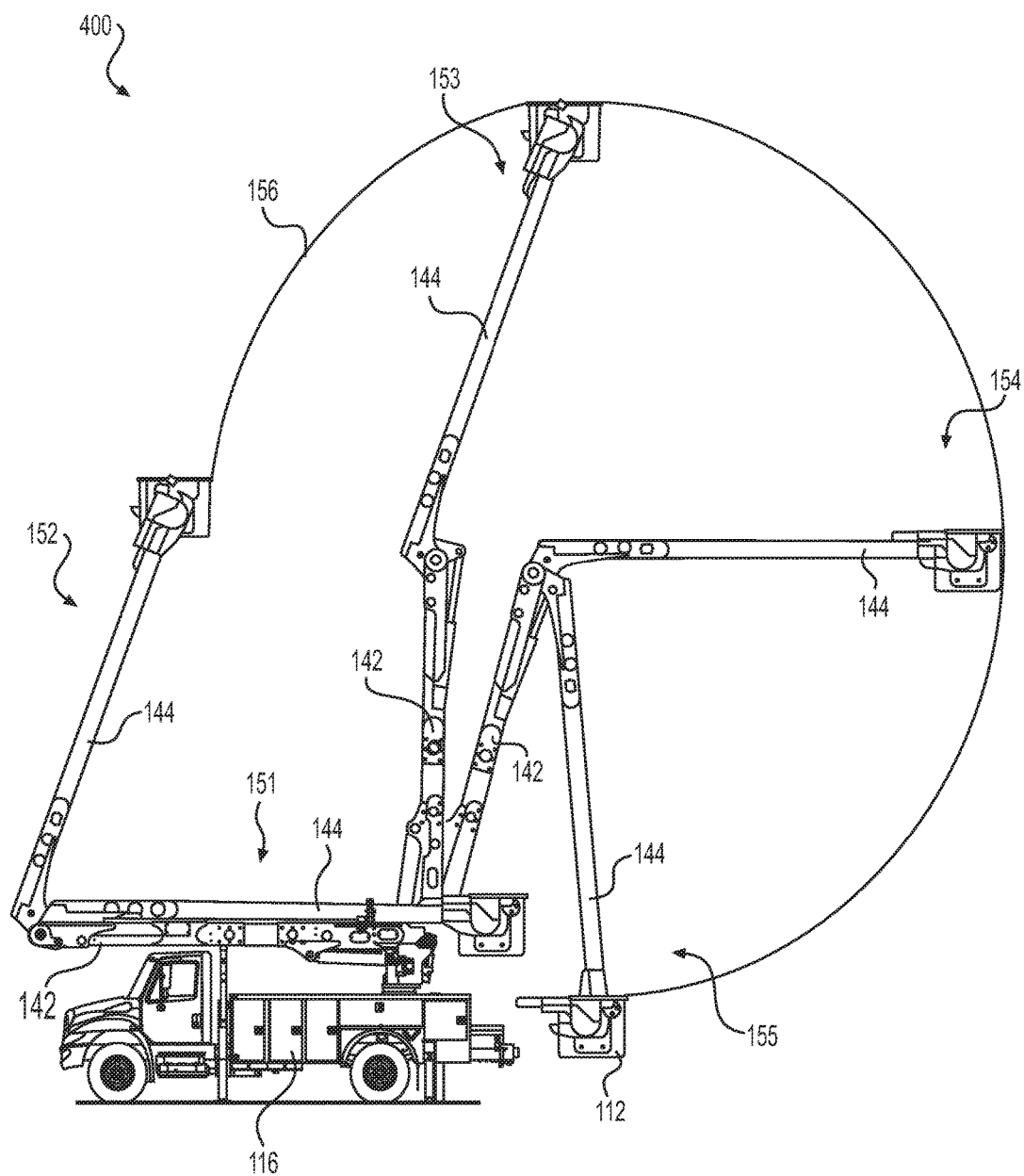
FIG. 4 shows illustrates five exemplary boom positions of an aerial device, in an embodiment.

The device 110 may further include an optional platform 112 mechanically coupled to a distal end of the boom 114. The platform 112 may be used to attach one or more objects, and the platform 112 may also be configured to support one or more operators (e.g., in a utility bucket). The weights of any onboard operators and attached objects collectively apply a load to the boom 114. FIGS. 2 through 4, described below, depict exemplary aerial devices having a boom and a platform.

Returning to FIG. 1, the platform 112 is mechanically coupled to a base 116, which may be a stationary or mobile support. In certain embodiments, the base 116 is a fixed structure such as a crane or an oilrig, or a mobile base such as an earth-working machine or a utility truck (e.g., see FIGS. 2 through 4). The base 116 is mechanically coupled to a first end of the boom 114, and the platform 112 is mechanically coupled to a second end of the boom 114, opposite the first end. In other words, the first end of the boom 114 may be described as a proximal end (e.g., proximal to the base 116), and the second end may be described as a distal end.

Extension of the boom 114 may be by one or more hydraulic cylinders mechanically coupled to segments of the boom 114. In certain embodiments, the boom 114 includes an optional lower boom 142 and an optional upper boom 144, which are used for extending the reach of the platform 112 for accessing difficult to reach locations. However, the boom 114 may include a fewer or a greater number of segments without departing from the scope hereof.

Excessive loads applied to the boom 114 (in magnitude and/or duration) may cause damage to the device 110, its components, and/or the load being lifted. Furthermore, excessive loads may risk harming an operator of the device 110, especially if the operator is onboard the platform 112 (e.g., in a utility bucket). In certain positions, boom linkages cause inefficient lifting, requiring an upsized hydraulic cylinder. As a result, hydraulic cylinder capacity is typically higher than the structural limits of the boom 114 for certain boom positions, which may lead to unsafe situations. Therefore, determining unsafe situations that are likely to cause excessive loads before they are performed with the device 110 may reduce or prevent damage or harm.

Traditional means of determining unsafe situations include displaying lifting capacity charts on an aerial device for assisting an operator in determining unsafe situations. In practice, however, the complexity of aerial device loading, due in part to positioning of the load (see e.g., load path in FIG. 4), may render the traditional means inadequate. Additionally, loads of unknown weight may be lifted with the aerial device, requiring guesswork by the operator to determine unsafe situations, which is especially true when the load is lashed directly to the boom 114. During phase lifting, in which the boom 114 is used to lift a power line, a large and unknown load may be placed on the boom 114. Embodiments of the present disclosure provide systems and methods for monitoring information about the device 110, determining when the device 110 is approaching an unsafe situation in real-time, and alerting an operator of the device 110 so that the operator may take appropriate corrective action to avoid an overload of the device 110.

Returning to FIG. 1, the sensor suite 120 sends one or more signals indicative of active information about the device 110 to the controller 130. The controller 130 determines an effective load on the device 110 based at least in part on the information received from the sensor suite 120. Based upon the effective load, and at least one load limit, the controller 130 determines whether to alert the operator of a potential unsafe situation. The steps of an exemplary method 500 for boom load monitoring are described below in connection with FIG. 5.

The sensor suite 120 includes at least one sensor for monitoring aspects of the device 110, including determining a hydraulic fluid pressure of a hydraulic cylinder mechanically coupled to the boom 114 for raising and lowering the boom 114. In some embodiments, an angle of an orientation of at least a portion of the boom 114 is also determined.

In certain embodiments, a first sensor 122 monitors position of the lower boom 142. The lower boom 142 may be pivoted upwardly with respect to a turntable 146 (see e.g., FIGS. 3 and 4) via a lower boom hydraulic cylinder 152, which is a mechanical actuator that uses pressurized hydraulic fluid. The first sensor 122 is, for example, an angle sensor located on the lower boom 142 and configured to measure a lower boom angle between the lower boom 142 and a substantially horizontal plane (e.g., a plane parallel with a top surface of the base 116). An exemplary lower boom angle sensor includes, but is not limited to, an inclinometer. Alternatively, a rotary encoder or a rotary variable differential transformer (RVDT) may be used to monitor rotation of the lower boom 142 about its pivot axis for determining the lower boom angle. In some embodiments, the first sensor 122 is a linear position sensor configured to monitor extension of the lower boom hydraulic cylinder 152, and the angle of the lower boom 142 is determined based on the extension of the hydraulic cylinder 152 in combination with known geometry parameters of the hydraulic cylinder 152 and the lower boom 142. An exemplary linear position sensor used for the first sensor 122 includes, but is not limited to, a linear encoder or a linear variable differential transformer (LVDT).

In certain embodiments, a second sensor 124 provides information for determining an upper boom joint angle 160 (see FIG. 2), which is the angle between the upper boom 144 and the lower boom 142. Alternatively, in some embodiments, the second sensor 124 provides information for determining an upper boom angle, which is the angle of the upper boom 144 with respect to the horizon. The second sensor 124 may be configured to monitor an extension position of an upper boom hydraulic cylinder 154 and provide the extension position information to the controller 130. The upper boom hydraulic cylinder 154 is a mechanical actuator using pressurized hydraulic fluid that extends to raise the upper boom 144, and retracts to lower the upper boom 144, with respect to the lower boom 142 (see FIGS. 2 through 4). In other words, the upper boom hydraulic cylinder 154 is configured to pivotally raise and lower the upper boom 144 with respect to the lower boom 142. An exemplary sensor used for the second sensor 124 is a linear position sensor (e.g., a linear encoder or a LVDT) to monitor the extension position of the upper boom hydraulic cylinder 154. Alternatively, the second sensor 124 may be a completely different type of sensor, such as an inclinometer adapted to measure the upper boom angle with respect to the horizon, or a rotary encoder or a RVDT configured to measure rotation information about an elbow 143 (see FIG. 2) connecting the lower boom 142 with the upper boom 144. Based on the information of the second sensor 124, in combination with known geometries of the boom 114 (e.g., the lower boom angle), controller 130 determines the upper boom joint angle 160.

In certain embodiments, a third sensor 126 monitors hydraulic fluid pressure of the upper boom hydraulic cylinder 154 and provides pressure information to the controller 130. The third sensor 126 is for example a pressure transducer that measures hydraulic fluid pressure on a bore side of the hydraulic cylinder. In some embodiments, the third sensor 126 includes a pair of pressure transducers, including a first pressure transducer on the bore side of the hydraulic cylinder and a second pressure transducer on a rod side of the hydraulic cylinder, and pressure values from both the first and second pressure transducers are provided to the controller 130. An effective load pressure on the upper boom hydraulic cylinder 154 may be determined based on a difference of a bore-side pressure and a rod-side pressure with respect to a ratio of the cross-sectional areas of the bore side and rod side: $P_{Effective\ load} = P_{bore} - P_{rod}(A_{bore}/A_{rod})$, as described below in connection with FIG. 5.

The information from the sensor suite 120 may be provided continuously (e.g., via an analog signal) or at regular intervals (e.g., a digital signal at a processor rate). Alternatively, the controller 130 may send a request for information from the sensor suite 120 at any instance or according to any schedule. Communication between the controller 130, the device 110, and the sensor suite 120 may be via a wired and/or wireless communication media. For example, the controller 130 may include a transmitter/receiver, a multi-channel input/output (I/O) data bus, or the like (not shown) for communicatively coupling with sensors of the sensor suite 120. Similarly, the sensor suite 120 may include a transmitter/receiver, a multi-channel I/O data bus, or the like (not shown) for communicatively coupling the at least one sensor (e.g., the first sensor 122, the second sensor 124, and the third sensor 126) with the controller 130.

In various embodiments, the controller 130 samples, receives, or otherwise acquires angle and pressure information from the sensor suite 120 occasionally, periodically, continuously, or substantially continuously. Additionally, or alternatively, the controller 130 may be sampling, receiving, or otherwise acquiring the angle and pressure indications only upon the presence of certain conditions. For example, the system 100 may have an idle mode in which the controller 130 is idle.

Signals from at least one sensor of the sensor suite 120 may be filtered to remove signal noise. For example, the signals may include oscillations or other signal spikes that could produce false-positive alerts. In an embodiment, a low-pass filter is tuned to oscillations of the boom 114 for filtering the signals. Alternatively, an exponential filter, a moving-average filter, or a finite impulse response (FIR) filter may be used.

Based on information from the at least one sensor of the sensor suite 120 and the lookup tables 136, the controller 130 may determine an effective load on the device 110. The lookup tables 136 provide predetermined information about the system 100 in the form of at least one set or matrix of data, as further described below.

The controller 130 is for example a computer, microcontroller, microprocessor, or programmable logic controller (PLC) having a memory 134, including a non-transitory medium for storing software 135, and a processor 132 for executing instructions of the software 135. An example of software instructions includes steps of method 500, described below in connection with FIG. 5. The controller 130 may further include an optional interface 138 for the user to transmit instructions and receive information. In an embodiment, a reset switch is provided for an operator to clear an overload indication for resetting the system 100 (e.g., following an inspection of the system 100). In some embodiments, the interface 138 includes a hand-held control stick (e.g., a joystick or sidestick controller) and/or one or more buttons for positioning components of the device 110 (e.g., the platform 112). The controller 130 is not limited by the materials from which it is formed or the processing mechanisms employed therein and, as such, may be implemented via semiconductor(s) and/or transistors (e.g., electronic integrated circuits (ICs)), and so forth. It should also be appreciated that the discussed functions and methods performed by the controller 130 may be performed by other processors.

The alert indicator 140 may provide an alert that informs an operator of the device 110 of a potential unsafe situation, such as an expected overload, as described below in connection with method 500, FIG. 5. The alert indicator 140 may include an alerting mechanism to produce the alert such as a display device, a speaker system, a headphone worn by the operator, a buzzer, light sources (e.g., multi-colored lights), or other similar alerting mechanisms.

FIG. 2 shows a side view of an aerial device 200. FIG. 3 shows a rear view of an aerial device 300. The aerial devices 200 and 300 are each examples of the device 110, FIG. 1. Similar components illustrated in different figures are enumerated with like numerals and may include alternative embodiments. FIGS. 2 and 3 are best viewed together with the following description.

The aerial devices 200 and 300 generally include some sort of base that supports an extendable member configured for reaching. In the embodiment depicted in FIGS. 2 and 3, the base 116 is a utility truck. The boom 114 provides an extendable member for moving the platform 112. The base 116 provides a stable support, which may include outriggers 118, for supporting a load applied to the boom 114 and/or the platform 112. In an embodiment, the platform 112 includes a jib 111 configured for securing objects thereto. The platform 112 may rotate to alter its orientation with respect to the boom 114. The boom 114 may fold into a collapsed position (see e.g., FIG. 4), which enables transporting via a mobile version of the base 116.

The boom 114 is mechanically coupled to, and configured to support, the platform 112. For extending the reach of the platform 112, the boom 114 may include more than one segment. For example, proximal to the base 116 is the optional lower boom 142, followed by the optional upper boom 144, which are connected to one another via the elbow 143. The optional platform 112 is located at the distal end (with respect to the mobile base 116) of the upper boom 144. As depicted in FIG. 3, the upper boom 144 may include an optional telescoping arm 145 that extends from, and retracts within, the upper boom 144. The lower boom 142 may be mechanically coupled to a turntable 146 configured for rotating the boom 114. A pedestal 147 may be included to support the turntable 146 and is mechanically coupled to the base 116. In the embodiment depicted in FIG. 3, the pedestal 147 includes an optional arm 141.

In operation, platform 112 is raised by a combination of the lower boom 142 pivoting upwards, the upper boom 144 pivoting about elbow 143, and the telescoping arm 145 optionally extending out of the upper boom 144.

In an embodiment, the platform 112 is configured for securing a load thereto (e.g., via the jib 111). The load may be any object having weight that is suspended from or otherwise applied to a component of the boom 114. Prior to extending the boom 114, the base 116 may be moved to an appropriate location and stabilized. The boom 114 may be rotated about the turntable 146, and extended upwards and outwards away from the base 116 by pivoting the lower boom 142, the upper boom 144, and by extending the telescoping arm 145. Various combinations of these movements may be employed to position the platform 112 (see e.g., FIG. 4). Operation of the platform 112 may be by remote control for operator convenience or safety.

In certain embodiments, the telescoping arm 145 and/or the upper boom 144 are electrically insulating to enable safe operation near electrical power lines. The one or more electrically insulating segments may be formed of a non-conductive material, such as a polymer or fiberglass, which may significantly reduce the structural strength of the segment compared to segments that are not electrically insulating. Accordingly, monitoring the load placed on an insulating segment may be desired to prevent structural failure.

FIG. 4 shows a side view of an aerial device 400, which is an example of aerial device 200 of FIG. 2. FIG. 4 illustrates five exemplary boom positions: a first position 151, a second position 152, a third position 153, a fourth position 154, and a fifth position 155. The first position 151 provides a folded or collapsed configuration enabling the aerial device 200 to be transported via a mobile version of the base 116. The second position 152 is characterized by the lower boom 142 remaining folded while the upper boom 144 is raised upwardly. The third position 153 provides a substantially upright orientation of the boom in which both the lower boom 142 and the upper boom 144 are fully-extended. The boom 114 is unfolding while transitioning from the first position 151 to the second position 152 and on to the third position 153. Conversely, the boom 114 is unfolding while transitioning from the third position 153 to the second position 152 and on to the first position 151.

The fourth position 154 is characterized by the lower boom 142 being raised upwardly and the upper boom 144 being oriented substantially horizontally, which provides a partially raised position that extends away from the base 116. The fifth position 155 lowers the platform 112 beneath a top of the base 116. The boom 114 is folding when transitioning from the third position 153 to the fourth position 154 and on to the fifth position 155. Conversely, the boom 114 is unfolding while transitioning from the fifth position 155 to the fourth position 154 and on to the third position 153.

A path 156 illustrates an exemplary trajectory that the platform 112 may take while moving between the positions 151 through 155. However, the positions 151 through 155 are exemplary only and a myriad of additional positions and paths may also be obtained by rotating, pivoting, and extending boom segments.

In operation, a load is applied to the platform 112, and the load is moved along a path (e.g., a portion of the path 156). Positions of the platform 112 along the path, and corresponding orientations of the segments of the boom 114, alter the effective load applied to the boom 114 (e.g., due to the extension and angle of the boom segments). For example, lifting a load from the ground to an elevated position may involve three lifting steps. In a first step, the boom 114 is oriented in the fifth position 155 enabling a load on the ground to be attached to the platform 112 (e.g., via the jib and/or cables, hooks, straps, etc.). In a second step, the load is raised from the fifth position 155 to the fourth position 154, which is characterized by extension of the upper boom 144. In a third step, the load is raised from the fourth position 154 to the third position 153, which is characterized by a full extension of the boom to reach an apex of the path 156. The lifting steps are described separately for clarity of illustration in connection with FIG. 4; however, the lifting of a load does not necessarily include a pause between steps, but instead the lifting steps may seamlessly transition from one step to the next.

The orientation of the boom 114 affects how a load applied to the distal end of the boom (e.g., at the platform 112) produces torque on the components of the boom 114. For example, when the boom 114 is oriented such that the load is not directly above the turntable 146, the load applies a torque via the boom 114 that could damage the boom 114 or turntable 146, or overturn the base 116. Method 500 monitors various aspects of the boom 114, determines safe operating positions for the platform 112, and alerts an operator in real-time if a potential unsafe situation is approached.

It should be appreciated that, while the above disclosure has been generally directed to the field of aerial devices, embodiments of this disclosure may be directed to other fields and uses. For example, embodiments of the boom load monitoring system may be used with a grappler attached to the end of the boom 114 (e.g., instead of the platform 112) and the load includes any object grasped by the grappler (e.g., a tree limb or telephone pole).

Figure 5:
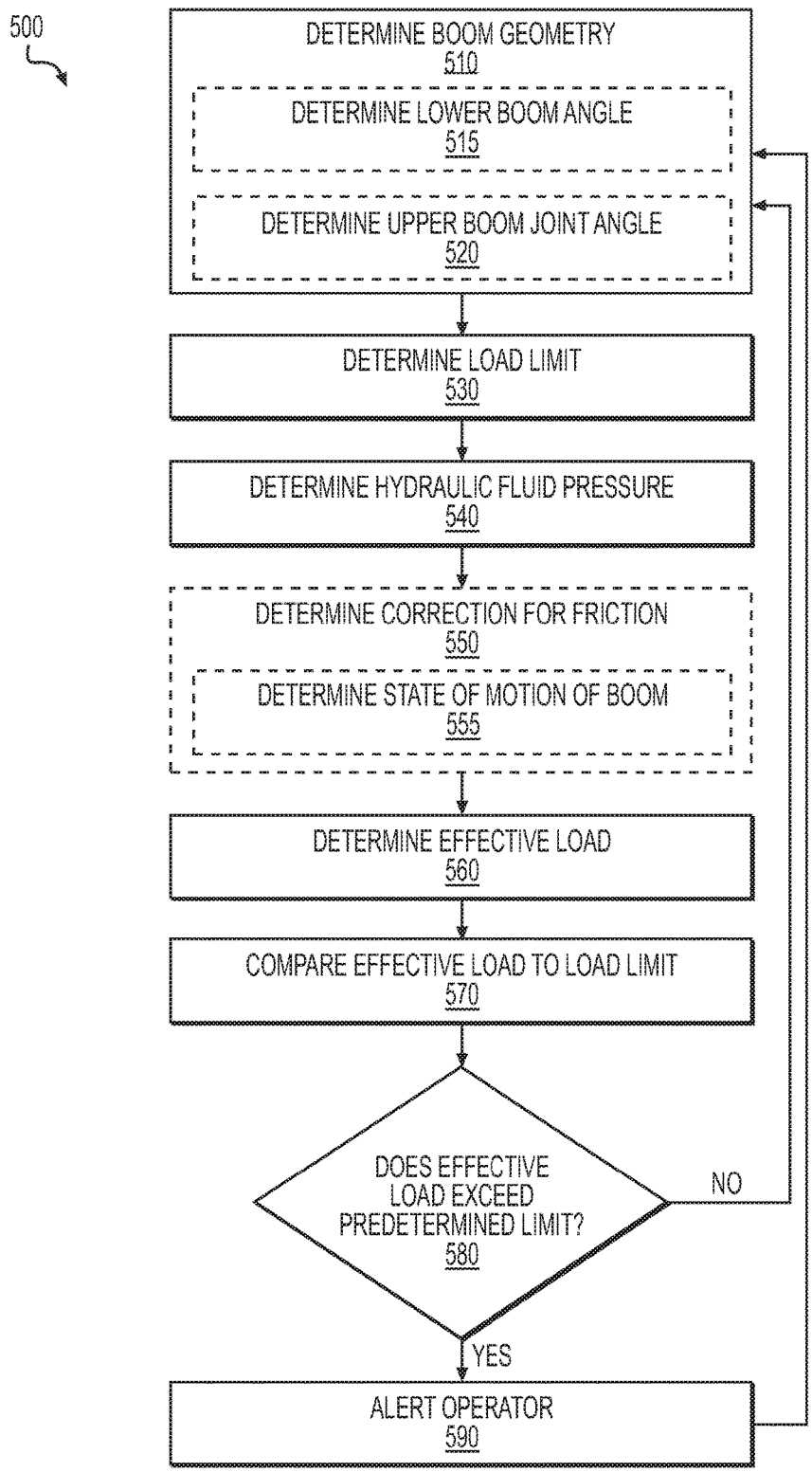
FIG. 5 shows steps of a boom monitoring method, in an embodiment.

FIG. 5 shows steps of an exemplary boom monitoring method 500. Method 500 may be performed using system 100 of FIG. 1, for example. Broadly, method 500 determines an effective load based on information received from the sensor suite 120 and predetermined information stored in the lookup tables 136, and determines a safe operating region in real-time. As position of the load approaches a boundary or limit of the safe operating region, the alert indicator 140 provides an alert to the operator in real-time so that the operator is able to avoid positioning the load beyond the safe operating region and therefore avoid overloading the boom 114. In the steps described below, the controller 130, FIG. 1 performs the various steps, but it should be appreciated that this is only an exemplary embodiment. Other electronic components or a combination thereof may perform any or all of the discussed steps.

In a Step 510, a current boom geometry is determined. In an example of step 510, the controller 130, FIG. 1 determines a real-time geometry of the boom 114 based on information received from the at least one sensor of the sensor suite 120. For example, the controller 130 receives information from the first sensor 122. The controller 130 may acquire the information actively (e.g., the controller 130 transmits a request to the first sensor 122 to retrieve the information) or the controller 130 may passively receive the information (e.g., the first sensor 122 automatically transmits the information). It should be appreciated that the controller 130 may be acquiring information from numerous different sensors simultaneously or in rapid succession.

In certain embodiments, the first sensor 122 is an inclinometer configured to measure an angle of at least a portion of the boom 114. During operation, the boom 114 may be raised, lowered, or held stationary, and the inclinometer measures an angle of at least some portion of the boom 114. Based on the measured angle, the controller 130 determines a real-time boom geometry.

In some embodiments, more than one sensor is used to monitor angles and/or positions of more than one segment of the boom 114, and the controller 130 determines the real-time geometry of the boom 114 based on the angles and/or positions. For example, Step 510 may include an optional Step 515 to monitor a lower boom angle and an optional Step 520 to monitor an upper boom joint angle.

In the optional Step 515, the first sensor 122 is e.g., an inclinometer configured to measure a lower boom angle of the lower boom 142, and the second sensor 124 measures an upper boom joint angle of the boom 114. For example, the second sensor 124 may measure an extension position of the lower boom hydraulic cylinder 152 and provide the extension position information to the controller 130 (either actively or passively, as described above for the first sensor 122). The controller 130 then calculates the upper boom joint angle 160 based on the extension position information of the second sensor 124 in combination with known geometry parameters of the lower boom 142, the upper boom 144, and the attachment locations of the upper boom hydraulic cylinder 154. In certain embodiments, the controller 130 monitors the upper boon joint angle over time to determine a state of motion of the boom 114 (e.g., whether the boom is folding, static, or unfolding). The signal from the second sensor 124 may be filtered using a time constant based on typical state of motion transitions. In an embodiment, a signal from the second sensor 124 is filtered by a latching discrete filter triggered by observing consecutive motion trends.

In a Step 530, a load limit is determined. In an example of Step 530, the controller 130 determines a load limit for a real-time boom geometry. The load limit is for example a theoretical limit that is calculated based on physical properties of the boom 114. A factor of safety may be incorporated into the load limit to ensure a margin of safety during operation. In certain embodiments, a set of load limit values are predetermined for a range of lower boom angles and a range of upper boom joint angles to provide a matrix of predetermined load values. The predetermined load values may be stored in the lookup tables 136. In an example of Step 530, the controller 130 determines the load limit in real-time by retrieving a predetermined load value from the lookup tables 136 based on a current lower boom angle and a current upper boom joint angle. In certain embodiments, the predetermined load values in the lookup tables 136 are hydraulic fluid pressures of the upper boom hydraulic cylinder 154 that correspond with maximum loads on the boom 114.

In a Step 540, a hydraulic fluid pressure is determined. In an example of Step 540, the third sensor 126 measures hydraulic fluid pressure of the upper boom hydraulic cylinder 154 and provides measured pressure information to the controller 130. The third sensor is for example a pressure transducer that measures hydraulic fluid pressure on a bore side of the upper boom hydraulic cylinder 154. In certain embodiments, the third sensor 126 includes a pair of pressure transducers, including a first pressure transducer on the bore side of the hydraulic cylinder and a second pressure transducer on a rod side of the hydraulic cylinder, and pressure values from both pressure transducers are provided to the controller 130. An effective load pressure on the upper boom hydraulic cylinder 154 may be determined based on a difference of a bore-side pressure and a rod-side pressure with respect to a ratio of the cross-sectional areas of the bore side and rod side.

In an optional Step 550, a correction to the hydraulic fluid pressure based on friction is determined. Friction arises within moving parts and reduces movement efficiency. For example, sliding rings and seals of a hydraulic cylinder piston create friction. Friction is unique to individual hydraulic devices due to such factors as cylinder wear, valve leakage over time, and manufacturing tolerances. Therefore, even for booms of the same design, the amount of friction experienced may differ between individual booms. Friction also varies due to changes in operating conditions (e.g., friction is temperature dependent). In addition, friction differs between folding and unfolding of the boom 114 due to hysteresis, which is generated by counterbalance valves and whether the boom 114 is moving the load with or against gravity. Therefore, corrections for friction may be empirically predetermined for accuracy, and corrections for friction may require recalibration over time or under different operating conditions. Corrections for friction may be based on lower boom angles, upper boom joint angles, and different states of motion of the boom 114 (e.g., folding, static, or unfolding). The state of motion of the boom 114 may be determined in a Step 555, described below. Correction for friction information may be stored in the software 135 (e.g., in the lookup tables 136) for retrieval upon calculating an effective load (e.g., in Step 560, described below).

At a certain upper boom joint angle, the load pressure reaches a maximum pressure, referred to hereinafter as a peak load pressure. In other words, as the upper boom joint angle is increased during unfolding from a minimum angle, the load pressure increases to the peak load pressure. The upper boom joint angle at which the peak load pressure occurs may be referred to as a peak load angle. As the boom continues unfolding to angles greater than the peak load angle, the load pressure decreases. In certain embodiments, the maximum amount of friction occurs when the upper boom joint angle is in proximity with the peak load angle. Therefore, the correction for friction may be based on a difference between the upper boom joint angle and the peak load angle (e.g., proportional to the difference).

In certain embodiments, the peak load angle and peak load pressure depend on the lower boom angle and the state of motion of the boom. For example, a higher peak load pressure and a higher peak load angle are observed at a larger lower boom angle (e.g., 105°) compared to a smaller lower boom angle (e.g., 90°). In another example, a higher peak load pressure and a higher peak load angle are observed when the boom 114 is unfolding compared to when the boom 114 is folding. The controller 130 may determine whether the boom 114 is folding, static, or unfolding by monitoring the upper boom joint angle over time.

In an optional Step 555, a state of motion of the boom is determined. In an example of Step 555, a motion observer monitors the upper boom joint angle 160 over time. The motion observer includes an algorithm stored in software 135 that determines a state of motion of the boom 114 based on a signal received by the controller 130 from the second sensor 124 to monitor the upper boom joint angle 160 over time. For example, if the upper boom joint angle 160 increases over a predetermined duration, the motion observer sets the state of motion of the boom to "unfolding". Likewise, if the upper boom joint angle 160 stays substantially the same over the predetermined duration, the motion observer sets the state of motion to "static", and if the angle 160 decreases over the predetermined duration, the motion observer sets the state of motion to "folding". The predetermined duration may be long enough to ignore signal spikes from the second sensor 124, and short enough to properly observe normal use of the boom 114 by the operator.

In a Step 560, an effective load is determined. In an example of Step 560, the controller 130 applies a correction for friction (determined in step 550) to the hydraulic fluid pressure (determined in step 540) to determine the effective load. The correction for friction accounts for friction among moving parts in the boom 114 and allows a measured load (e.g., the measured hydraulic fluid pressure) to be matched with a calculated load (e.g., the load limit). Optionally, a correction for friction is not used, in which case the effective load is determined from the measured load pressure (determined in Step 540).

In a Step 570, the effective load is compared to the load limit. In an example of Step 570, the controller 130 determines a ratio of the effective load (determined in Step 560) to the load limit (determined in Step 530) for the same boom geometry (e.g., the same lower boom angle and the upper boom joint angle). The ratio of the effective load to the load limit provides a real-time fraction or percentage of the maximum load lifting capacity for a particular boom geometry. For example, a percentage of 100% indicates that the effective load is equal to the load limit, whereas a percentage of 90% indicates that the effective load is 90% of the load limit (e.g., 10% less than the load limit).

A Step 580 is a decision. If in Step 580, the controller 130 determines that the effective load exceeds a predetermined limit, method 500 proceeds with Step 590 to alert the operator. Otherwise, method 500 returns to step 510 to repeat the steps 510 through 580 to determine a real-time effective load percentage of the load limit. In this manner, method 500 continually monitors the load on the boom 114 while in use to ensure safe operation.

In an example of Step 580, the controller 130 compares the effective load percentage of the load limit with a predetermined limit. For example, the predetermined limit may be a percentage of the load limit, such as 90%, which provides a 10% margin for error. In certain embodiments, the controller 130 may compare the effective load percentage of the load limit with more than one predetermined limit, such as a minimum limit, an intermediate limit, and an upper limit, to distinguish between different levels of potential hazard. For example, the minimum limit may be 70%, the intermediate limit may be 80%, and the upper limit may be 90%. However, these percentages are exemplary only and others may be used without departing from the scope hereof.

Appropriate alerts may be generated for different levels of overload risk based on the effective load percentage of the load limit (see description of Step 590, below). Alternatively, the effective load percentage of the load limit may be reported directly to an operator (e.g., via the alert indicator 140) in real-time, enabling the operator to monitor changes in the percentage (e.g., with text and/or graphs) to avoid unsafe operating conditions. Changes to the effective load percentage of the load limit may be used by the controller 130 to predict when the device 110 is approaching an unsafe situation in real-time (e.g., based on a rate of change of the percentage).

In certain embodiments, the limit may be predetermined, set, fixed, or variable. As used herein, "limit" may mean a value or set of values (e.g., a matrix of values), a ratio or percentage, a variable determined from an equation of other values, or another mathematical expression. The limit is indicative of certain conditions within the device 110. Other factors may also affect the limit, such as operating temperatures, the type of work being performed, other strains and tasks being performed by the device, and the like. For example, friction is temperature dependent. Therefore, in some embodiments, the limit may be determined, at least partially, based upon indications of various operating conditions, such as temperature. In other embodiments, the limit may be a static set of predetermined values, based upon various static and known characteristics of the operating conditions.

In a Step 590, an alert is provided to a user. In an example of Step 590, the controller 130 instructs the alert indicator 140 to provide an alert based on the real-time effective load percentage of the load limit and the predetermined limit. The alert may include audible alarms (e.g., buzzers), audible voices, visual alarms (e.g., lights), visible text, graphs, or the like (or some combination thereof). In some embodiments, the alert is configured to communicate with a remote, external computer system or mobile device. The external computer system or mobile device may be associated with a remote location used for remote control of the device 110.

If more than one predetermined limit is used in Step 580, more than one corresponding alert may be used in Step 590. For example, the minimum limit may trigger a caution-type alert to indicate that caution should be exercised; the intermediate limit may trigger a warning-type alert to indicate that a condition may possibly be unsafe; and, the upper limit may trigger an emergency-type alert to indicate a high likelihood that the condition is unsafe. The caution, warning, and emergency alerts may be easily distinguishable from one another such that the operator may take appropriate preventative actions to prevent damage to the device 110. In other words, different alerts may be produced based on the effective load percentage of the load limit. Following Step 590, method 500 returns to step 510 to repeat the steps 510 through 580 for continuing to determine in real-time if the effective load exceeds the predetermined limit to ensure safe operation of the boom 114.

Although embodiments of this disclosure have been described with reference to the illustrations in the attached drawing figures, it is noted that equivalents may be employed and substitutions made herein without departing from the scope hereof as recited in the claims.

Having thus described various embodiments, what is claimed as new and desired to be protected by Letters Patent includes the following:

1. A boom load monitoring system, comprising;
   a first sensor that monitors a lower boom angle, the lower boom angle being between a lower segment of a boom and a substantially horizontal plane;
   a second sensor that monitors an upper boom joint angle, the upper boom joint angle being between the lower segment and an upper segment of the boom;
   an upper boom hydraulic cylinder disposed between the lower segment of the boom and the upper segment of the boom;
   a third sensor that monitors a hydraulic fluid pressure of the upper boom hydraulic cylinder configured to pivotally raise and lower the upper segment with respect to the lower segment;
   a controller having a non-transitory memory and a processor for processing software instructions stored in the memory, the controller being communicatively coupled with the first sensor, the second sensor, and the third sensor, wherein the controller performs the steps of:
      determining a load limit based on the lower boom angle, the upper boom joint angle, and predetermined load values stored in the memory;
      tracking the lower boom angle over time and the upper boom angle over time;
      determining a current state of motion of the upper boom cylinder based upon the tracking of the lower boom angle over time and the upper boom angle over time;
      determining a current friction-correction factor based at least in part on the determined current state of motion of the upper boon cylinder;
      applying the current friction-correction factor to the hydraulic fluid pressure measured by the third sensor to determine an effective load on the boom; and
      determining whether the effective load exceeds the load limit; and
   an alert indicator communicatively coupled to the controller for producing an alert when the effective load exceeds the load limit.

2. The boom load monitoring system of claim 1, wherein the alert indicator provides a warning to the operator based on the effective load percentage of the load limit.

3. The boom load monitoring system of claim 1, wherein the first sensor is an inclinometer located on the lower boom for measuring the lower boom angle.

4. The boom load monitoring system of claim 1, wherein the second sensor measures information about one of the upper boom or the upper boom hydraulic cylinder, and the controller determines the upper boom joint angle based on information received from the second sensor and geometry parameters of the boom stored in the memory.

5. The boom load monitoring system of claim 1, wherein the third sensor includes a pair of pressure transducers, comprising:
   a first pressure transducer located on a bore side of the upper boom hydraulic cylinder for measuring a bore-side pressure; and
   a second pressure transducer located on a rod side of the upper boom hydraulic cylinder for measuring a rod-side pressure,
   wherein the controller determines an effective load pressure on the upper boom hydraulic cylinder based on a difference of the bore-side pressure and the rod-side pressure and a ratio of a bore side cross-sectional area and a rod side cross-sectional area.

6. A boom load monitoring system, comprising:
   a first sensor that monitors a lower boom angle, the lower boom angle being between a lower segment of a boom and a substantially horizontal plane;
   a third sensor that monitors a hydraulic fluid pressure of an upper boom hydraulic cylinder configured to pivotally raise and lower an upper segment with respect to the lower segment;
   a controller having a non-transitory memory and a processor for processing software instructions stored in the memory, the controller being communicatively coupled with the first sensor and the third sensor, wherein the controller performs the steps of:
      determining a load limit based on the lower boom angle and predetermined load values stored in the memory;
      tracking the lower boom angle over time and the upper boom angle over time;
      determining a current state of motion of the upper boom cylinder based upon the tracking of the lower angle over time and the upper boom angle over time;
      determining a current friction-correction factor based at least in part on the determined current state of motion of the upper boom cylinder;
      applying the current friction-correction factor to the hydraulic fluid pressure to determine an effective load on the boom; and
      determining whether the effective load exceeds the load limit; and
   an alert indicator communicatively coupled to the controller for producing an alert when the effective load exceeds the load limit.

7. The boom load monitoring system of claim 6, wherein the alert indicator provides a warning to the operator based on the effective load percentage of the load limit.

8. The boom load monitoring system of claim 6, wherein the first sensor is an inclinometer located on the lower boom for measuring the lower boom angle.

9. The boom load monitoring system of claim 6, wherein the third sensor includes a pair of pressure transducers, comprising:
   a first pressure transducer located on a bore side of the upper boom hydraulic cylinder for measuring a bore-side pressure; and
   a second pressure transducer located on a rod side of the upper boom hydraulic cylinder for measuring a rod-side pressure,
   wherein the controller determines an effective load pressure on the upper boom hydraulic cylinder based on a difference of the bore-side pressure and the rod-side pressure and a ratio of a bore side cross-sectional area and a rod side cross-sectional area.

10. The boom load monitoring system of claim 6, further comprising:
    a second sensor that monitors an upper boom joint angle, the upper boom joint angle being between the lower segment and an upper segment of the boom.

11. The boom load monitoring system of claim 10, wherein the second sensor measures information about one of the upper boom or the upper boom hydraulic cylinder, and the controller determines the upper boom joint angle based on information received from the second sensor and geometry parameters of the boom stored in the memory.

12. A boom load monitoring system, comprising:
a first sensor that monitors a lower boom angle, the lower boom angle being between a lower segment of a boom and a substantially horizontal plane;
an upper boom hydraulic cylinder configured to pivotally raise and lower an upper segment with respect to the lower segment;
a first pressure transducer located on a bore side of an upper boom hydraulic cylinder for measuring a bore-side pressure;
a second pressure transducer located on a rod side of the upper boom hydraulic cylinder for measuring a rod-side pressure;
a controller having a non-transitory memory and a processor for processing software instructions stored in the memory, the controller being communicatively coupled with the first sensor and a third sensor, wherein the controller performs the steps of:
  determining an effective load pressure on the upper boom hydraulic cylinder based on a difference of the bore-side pressure and the rod-side pressure and a ratio of a bore side cross-sectional area and a rod side cross-sectional area;
  determining a load limit based on the lower boom angle and predetermined load values stored in the memory;
  tracking the lower boom angle over time and the upper boom angle over time;
  determining a current state of motion of the upper boom cylinder based upon the tracking of the lower boom angle over time and the upper boom angle over time;
  determining a current friction-correction factor based at least in part on the determined current state of motion of the upper boom cylinder;
  applying the current friction-correction factor to the hydraulic fluid pressure to determine an effective load on the boom; and
  determining whether the effective load exceeds the load limit; and
an alert indicator communicatively coupled to the controller for producing an alert when the effective load exceeds the load limit.

13. The boom load monitoring system of claim 12, wherein the alert indicator provides a warning to the operator based on the effective load percentage of the load limit.

14. The boom load monitoring system of claim 12, wherein the first sensor is an inclinometer located on the lower boom for measuring the lower boom angle.

15. The boom load monitoring system of claim 12, further comprising:
a second sensor that monitors an upper boom joint angle, the upper boom joint angle being between the lower segment and an upper segment of the boom.

16. The boom load monitoring system of claim 15, wherein the second sensor measures information about one of the upper boom or the upper boom hydraulic cylinder, and the controller determines the upper boom joint angle based on information received from the second sensor and geometry parameters of the boom stored in the memory.

* * * * *